United States Patent [19]

Asbrink

[11] Patent Number: 4,845,509
[45] Date of Patent: Jul. 4, 1989

[54] MULTIPLE LOOP RECEIVING DEVICE IN A SECURITY SYSTEM

[75] Inventor: Leif Åsbrink, Vingåker, Sweden

[73] Assignee: Intermodulation and Safety System AB, Sweden

[21] Appl. No.: 105,300

[22] PCT Filed: Jan. 16, 1987

[86] PCT No.: PCT/SE87/00015

§ 371 Date: Sep. 15, 1987

§ 102(e) Date: Sep. 15, 1987

[87] PCT Pub. No.: WO87/04551

PCT Pub. Date: Jul. 30, 1987

[30] Foreign Application Priority Data

Jan. 21, 1986 [SE] Sweden .............................. 8600258-1

[51] Int. Cl.⁴ ..................... G08B 13/24; H01Q 7/04
[52] U.S. Cl. ................... 343/867; 343/742; 340/572
[58] Field of Search ............... 343/742, 728, 842, 866, 343/867, 896; 340/572

[56] References Cited

U.S. PATENT DOCUMENTS 4,118,693 10/1978 Novikoff ............................. 340/572
4,243,980 1/1981 Lichtblau ............................ 343/742
4,633,250 12/1986 Anderson, III et al. ........... 340/572

FOREIGN PATENT DOCUMENTS 8200378 2/1982 PCT Int'l Appl. ................ 343/842

Primary Examiner—William L. Sikes
Assistant Examiner—Doris J. Johnson
Attorney, Agent, or Firm—Silverman, Cass, Singer & Winburn, Ltd.

[57] ABSTRACT

A receiving device for detecting the presence of an indicating device in a restricted investigation zone, where coils and associated feed and receiving equipment are provided to emit and receive magnetic alternating fields in order thereby to detect the presence of an indicating device in the investigation zone, which indicating device is capable to receive alternating fields and to re-emit an alternating field. Said receiving coils for receiving said re-emitted alternating field comprise at least two coil sets (10,10′,10″), each of which constitutes a so-called balanced coil wound to a configuration corresponding to two substantially rectangular eights located to the side of each other in the same plane. The coil sets (10,10′,10″) are located in parallel with each other, preferably in the same plane, where each of the coil sets (10,10′,10″) is offset, relative to an adjacent coil set, in a direction in parallel with said plane through a distance corresponding to about one fourth of the distance (2a) in the offset direction between the outer opposed sides (18,11;14,15) in a coil set (10).

9 Claims, 2 Drawing Sheets

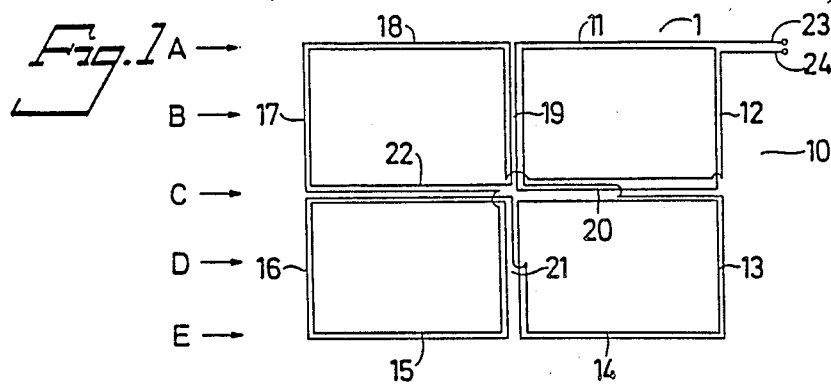
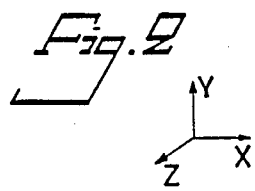
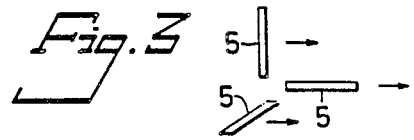
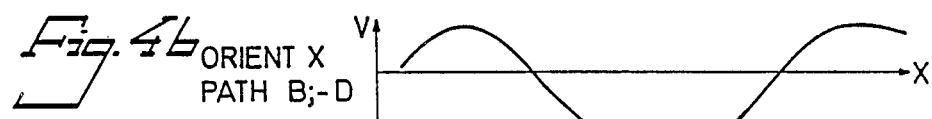
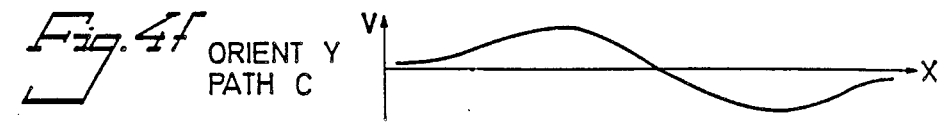

U.S. Patent    Jul. 4, 1989    Sheet 2 of 2    4,845,509
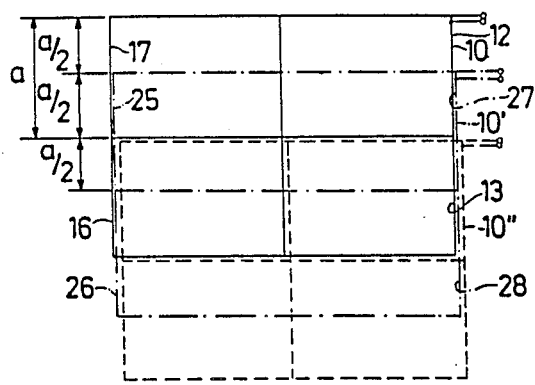
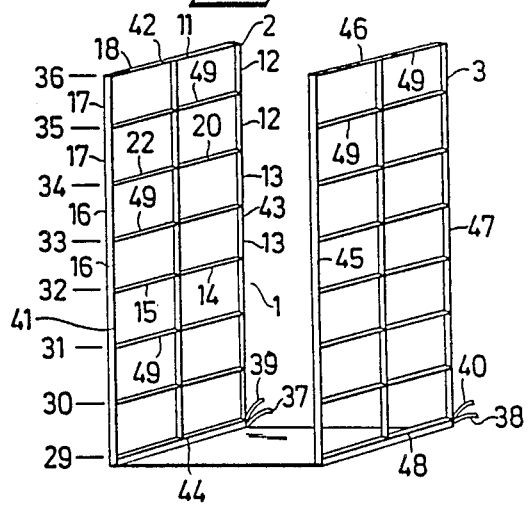
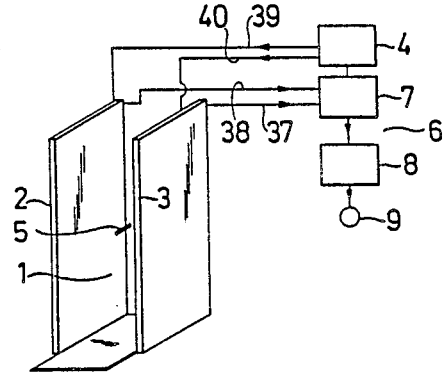

MULTIPLE LOOP RECEIVING DEVICE IN A SECURITY SYSTEM

BACKGROUND OF THE INVENTION

This invention relates to a receiving device for receiving a magnetic field in connection with a goods monitoring system.

In SE-PS 8404691-1 a system for detecting the presence of indicating devices is described which have the form, for example, of a narrow and thin, but relatively long strip of a highly permeable material, such as being commercially available under the name Permalloy. The presence of such strips is detected by means of coils, which emit and receive magnetic fields, and by means of devices for the detection of signals received.

When such a strip is exposed to a relatively weak external magnetic field, it assumes in its longitudinal direction a magnetic flux density, the magnitude of which can be twenty thousand times higher than in the external magnetic field. The presence of such strips is detected by a detector device, in which variations in voltage induced in a receiver coil are detected.

According to said patent, two coils are caused to emit a magnetic alterating field of high frequency, where a first one of the coils emits an alternating field with a frequency, which is different from the frequency of the field emitted by the second one of the coils, and where at least one difference and/or sum frequency $n \cdot f_1 + m \cdot f_2$ arising by intermodulation by the indicating device, where n and m are positive or negative integers, is caused to be received by one or several coil. According to the patent, a third magnetic alternating field of low frequency is caused to be emitted in said zone which has a frequency substantially lower than said frequencies $f_1, f_2$, where the low-frequency field is caused to have a field intensity sufficiently high for, independently of the fields with the frequencies $f_1$ and $f_2$, putting the indicating device into saturated condition in step with the frequency of the low frequency field. A field re-emitted from the indicated device is caused to be detected by means of a detector device as an intermodulation, occurring periodically with the frequency of the low-frequency field, between the frequencies $f_1$ and $f_2$.

One problem with known theft-prevention systems is that the orientation of the strip in the space is of great importance for whether or not the presence of the strip in the investigation zone will be detected and, thus, whether of not alarm will be sounded. This problem normally has been solved in such a way, that emitting and receiving coils were positioned in different places relative to the investigation zone.

Another problem is that a simple receiving coil is relatively sensitive to interferences of various kind, originating from other electric devices installed in shop premises.

SUMMARY OF THE INVENTION

The present invention provides a solution of the aforesaid problems. The present invention comprises receiving coils so arranged that indication of the presence of a strip in the investigation zone substantially takes place independently of the orientation of the strip in the space, and so arranged that they are insensitive to external interferences.

This implies that the number of expected false alarms is reduced, which is of utmost importance for a goods monitoring system of the kind here concerned.

The present invention, thus, relates to a receiving device for detecting the presence of an indicating device in a restricted investigation zone, where coils and associated feeding and receiving equipment are provided for emitting and receiving magnetic alternating fields, in order thereby to detect the presence of an indicating device in the investigation zone, which indicating device is capable to receive alternating fields and to re-emit an alternating field. The invention is characterized in that said receiving coils, which are provided to receive said re-emitted alternating fields, comprise at least two coil sets, where each coil set is a so-called balanced coil wound to a configuration corresponding to two substantially rectangular eights located to the side of each other in the same plane, and that said coil sets are located in parallel with each other, preferably in the same plane, where each of the coil sets is offset, relative to an adjacent coil set, in a direction in parallel with said plane through a distance corresponding to about one fourth of the distance in the offset direction between the outer opposed sides in a coil set.

BRIEF DESCRIPTION OF THE DRAWINGS

The invention is described in greater detail in the following, with reference to an embodiment thereof shown in accompanying drawings and elucidating sketches, in which FIG. 1 shows schematically a coil, which is utilized according to the invention, and indicates different transport directions A-E for an indicating device in the form of said strip, FIG. 2 shows a co-ordinate system, in which the coil in FIG. 1 is located in the x-y plane, FIG. 3 shows a strip oriented in the x-direction, y-direction and z-direction, respectively, FIGS. 4a–4f show schematically the signal intensity (v), which is obtained at the passage of a strip past the coil in FIG. 1, depending on the orientation of the strip (x;y;z) and transport path (A-E), FIG. 5 is an elucidating Figure to illustrate a coil set comprising three coils according to FIG. 1, FIG. 6 shows a monitoring zone, and FIG. 7 shows schematically a complete device for indicating the presence of an indicating device in an investigation zone.

DESCRIPTION OF THE PREFERRED EMBODIMENTS

In FIG. 7 a device for detecting the presence of an indicating device is shown schematically, which indicating device, for example, has the form of a strip of a highly permeable material and is located in a restricted investigation zone 1, which is defined by two parallel screens 2,3, which comprise coils for emitting and receiving magnetic alternating fields. A feeding device 4 is provided for emitting a field of a certain frequency by means of emitting coils. The indicating device 5 is provided to receive said fields and to re-emit an alternating field, which comprises a frequency other than that of the emitted frequency. A receiving equipment is provided for receiving a signal arising in the receiving coils due to the alternating field re-emitted by the indicating device. The receiving equipment 6 comprises a receiver 7 and a detector circuit 8 capable to detect and interpret the signal received. When the detector circuit 8 receives a signal, which agrees with the criterion or criteria applying when an indicating device is present in the investigation zone, the detector circuit 8 emits a signal to an alarming device 9 of known kind. The system described above can be similar to that described in said Swedish patent. The present invention, however, can be used as an indicating device of a different kind, for example an indicating device in the form of a resonance circuit.

According to the present invention, the receiving coils are designed in a special way. According to the invention, the receiving coils comprise at least two coils sets, as described below. In FIG. 5 three coils sets are shown, where a first one 10 is shown by fully drawn lines, a second one 10' is shown by dash-dotted lines, and a third one 10" by dashed lines.

In FIG. 1 a coil set 10 is shown in greater detail. The coil set 10 is a so-called balanced coil wound to a configuration corresponding to two substantially rectangular eights, which are located to the side of each other in the same plane. As appears from FIG. 1, the coil set 10 has such a configuration, that the outer winding portions 11-18 form a rectangle, and the remaining winding portions 19-22 divide the rectangle into four smaller rectangles of equal size.

The coil set 10 is wound so that from one pole 23 of it the conductor extends to the second pole 24 via the winding portions as follows: 11,19,20,12,11,19, 20,13,14,21, 20,13,14,21,22,16,15, 21,22, 16,15, 21,22, 17,18,19, 22, 17, 18,19,20, 12. The winding portions 11-18, thus, comprise two turns, and the winding portions 19-22 comprise four turns. The coil portions, thus, which are constituted by said smaller rectangles are wound so, that the rectangles in the first and third quadrant are wound in the same direction while the rectangles in the second and fourth quadrant are wound in opposite directions.

In FIG. 3 an indicating device is shown, which has the form of a strip of a highly permeable material in three different orientations x,y and z according to the co-ordinate system in FIG. 2. In the following reasoning the coil set 10 is assumed to be located in the x-y plane.

The letters A-E indicate five different imagined transport paths for a strip 5 when it is transported in the x-y plane past the coil set 10. A, thus, implies that the strip is transported along the winding portions 18 and 1. B implies, that the strip is transported along a path located centrally between the winding portions 18, 11 and, respectively, 22, 20. C-E have a corresponding meaning.

The dimensions of the strip 5 are only, for example, 25×2×0.1 mm while the coil set can have outer dimensions of, for example, 100×80 cm.

In FIGS. 4a-4f the signal intensity (v) is illustrated, which is obtained when a strip 5 is moved in the x-direction according to the paths A-E. At each diagram both the transport path (PATH) and the orientation (ORIENT) of the strip are indicated. In FIG. 4a, thus, the signal (v) is shown which is received when the strip is x-oriented and follows the path A in FIG. 1. The indication "-E" implies, that a signal corresponding to the one shown, but with opposite sign, is received when the strip is x-oriented and follows the path E. The FIGS. 4b-4f show in a corresponding way the signal for different orientations of the strip when it follows different paths.

When the strip is x-oriented or z-oriented, no signal or only a very weak one is received when the strip follows the path C. When the strip is y-oriented, no signal or a very weak one is received when the strip follows one of the paths B or D.

According to the present invention, therefore, the receiving device comprises at least two coil sets 10, 10', of the kind shown in FIG. 1, where each coil set 10, 10', 10" is a balanced coil wound to a configuration corresponding to two substantially rectangular eights located to the side of each other in the same plane. The coil sets 10, 10', 10" are located in parallel with each other and preferably in the same plane. Each of the coil sets is offset, relative to an adjacent coil set, in a direction in parallel with said plane through a distance (a/2) corresponding to about one fourth of the distance (2a) in the offset direction between the outer opposed sides 18,11;14,15 in a coil set 10.

It is hereby obtained, that the paths A-E of the second coil set 10' are offset relative to the paths A-E of the first coil set. Thus, the path B of the coil 10 corresponds to the path A of the coil 10'; the path C of the coil 10 corresponds to the path B of the coil 10', a.s.o. This implies, that a signal (v) is received from one or the other or from both of the coil sets 10, 10', irrespective of which orientation the strip has and which path it follows.

It is obvious that between the paths indicated as well as at an orientation of the strip in a direction between the x-,y-z-directions a signal will be received in a corresponding way.

According to a preferred embodiment, each coil set partially overlaps an adjacent coil set, so that two respective opposed winding portions 16,17; 12,13, and 25,26; 27,28, respectively, of each of the coil sets 10, 10' are located along two respective straight lines, i.e. as illustrated in FIG. 5.

According to another preferred embodiment, a set of receiving coils comprises at least four coil sets in a vertical plane where they are offset relative to each other in the way stated above in a vertical plane, and where the total height of the coil sets exceeds 1.5 meters, preferably 1.7 meters, and the total width of the coil sets exceeds 0.5 m and preferably is about 0.8 m. A vertical screen 2:3 of such design is shown in FIG. 6.

In the embodiment shown in FIG. 6, the uppermost located coil set extends from the indicated level 36 to the level 32. The winding portions according to FIG. 1 are marked in FIG. 6. In a corresponding manner, the second coil set extends between the levels 35 and 31, the third coil set between the levels 34 and 30, and the fourth coil set between the levels 33 and 29.

According to a further preferred embodiment, two sets of receiving coils, i.e. screens 2,3, are positioned in parallel with each other and at a distance from each other of about 0.5 to 1.0 m, as illustrated in FIG. 6, whereby a restricted investigation zone 1 is formed between the same.

The receiving device preferably is capable to receive alternating fields of such frequency, that the wave length is long compared to the height and width of the coil sets, especially a frequency below 100 MHz, preferably below 30 MHz.

This implies, that the coil sets act as fully balanced coils to interferences arising from a place located at a distance from the coils, which distance corresponds to a minimum distance of about 4a to 6a, see FIG. 5. Hereby so-called remote interferences, from electric devices in the premises, are effectively oppressed.

The said coil sets are connected via conductors 37,38 to the receiver 7, where emf generated in the coils are sensed.

The said emitting coils (not shown) preferably extend along the periphery 41-44; 45-48 formed by the coil sets. These emitting coils are connected via conductors 39,40 to the feed equipment 4.

According to another further preferred embodiment of the invention, the winding portions of the coil sets extend in tubular portions, only five of which are marked in FIG. 6 by the numeral 49. The ends of the tubular portions are attached to each other so, that a frame is formed, which has the configuration of a grid forming a number of rectangular squares, as illustrated in FIG. 6. This embodiment provides the advantage, that the staff easily can monitor persons passing the investigation zone 1.

It is obvious that the present invention eliminates in a simple way the disadvantages referred to in the introductory part.

The present invention, of course, can be varied in different ways without abandoning the invention idea, that at least two coil sets are used which are offset relative to each other.

The present invention, thus, must not be regarded as restricted to the embodiments described above, but can be varied within the scope defined in the attached claims.

I claim:

1. A receiving device for detecting the presence of an indicating device in a restricted investigation zone, where coils and associated feed and receiving equipment are provided for emitting and receiving magnetic alternating fields in order thereby to detect the presence of an indicating device in the investigation zone, which indicating device is capable to receive alternating fields and re re-emit an alternating field, characterized in that said receiving coils, which are provided to receive said re-emitted alternating field, comprise at least two coils sets (10,10',10''), where each coil set constitutes a balanced coil wound to a configuration corresponding to two substantially rectangular eights located to the side of each other in the same plane, and that said coil sets (10,10',10'') are located in parallel with each other where each of the coil sets (10, 10',10'') is offset, relative to an adjacent coil set, in a direction in parallel with said plane a distance corresponding to about one fourth of the distance (2a) between the outer opposed sides (18,11;14,15) in a coil set (10), which sides are aligned substantially perpendicular to said offset direction.

2. A receiving device as defined in claim 1, characterized in that each of the coil sets (10,10',10'') has such a configuration, that the outer winding portions (11-18) form a rectangle and the remaining winding portions (19-22) divide the rectangle into four smaller rectangles of equal size.

3. A receiving device as defined in claim 2, characterized in that those of said smaller rectangles constituting the first and third quadrant comprise a respective coil wound in the same direction, while those of said smaller rectangles constituting the second and fourth quadrant comprise a coil wound in the opposed direction.

4. A receiving device as defined in claim 1, characterized in that each coil set (10,10', 10'') partially overlaps an adjacent coil set, and that two respective opposed outer winding portions (17,16;12,13 and, respectively, 25,26;27,28) of each of the coils sets (10,10') are located along two respective straight lines.

5. A receiving device as defined in claim 4, characterized in that one set of receiving coils (2;3) at least comprises four coil sets, which are positioned in a vertical plane and offset relative to each other in the vertical plane, where the total height of the coil sets exceeds 1.5 m and preferably is about 1.7 m, and where the total width of the coil sets exceeds 0.5 m and preferably is about 0.8 m.

6. A receiving device as defined in claim 5, characterized in that two sets of receiving coils (2;3) are located in parallel with each other and at a distance from each other of about 0.5 m to 1.0 m to form a restricted investigation zone.

7. A receiving device as defined in claim 6, characterized in that it is capable to receive alternating fields of such a frequency, that its wave length is long compared to the height and width of the coil sets (10,10',10''), especially a frequency below 100 MHz, preferably below 30 MHz.

8. A receiving device as defined in claim 7, characterized in that said emitting coil or coils extend along the whole periphery (41-44; 45-48) formed by the two or more coils sets.

9. A receiving device as defined in claim 8, characterized in that the winding portions (12-22) of the coil sets (10) extend in tubular portions (49) of a frame, and the ends of said tubular portions (49) are attached to each other so that the frame has the form of a grid where a number of rectangular squares are formed by the tubular portions.

* * * * *

UNITED STATES PATENT AND TRADEMARK OFFICE
CERTIFICATE OF CORRECTION

PATENT NO. : 4,845,509
DATED : July 4, 1989
INVENTOR(S) : Leif Asbrink

It is certified that error appears in the above-identified patent and that said Letters Patent is hereby corrected as shown below:

Column 4, line 15 "(a/2)" should be --(a/-)--.

Signed and Sealed this

Eighth Day of May, 1990

Attest:

HARRY F. MANBECK, JR.

Attesting Officer

Commissioner of Patents and Trademarks